United States Patent [19]

Drew

[11] 4,270,605
[45] Jun. 2, 1981

[54] BLADDER HOLDER ASSEMBLY FOR TIRE MAKING MACHINE

[75] Inventor: Kenneth C. Drew, Indiana County, Pa.

[73] Assignee: McCreary Tire & Rubber Company, Indiana, Pa.

[21] Appl. No.: 5,923

[22] Filed: Jan. 23, 1979

[51] Int. Cl.$^3$ ...................... B29H 17/16; B29H 17/22
[52] U.S. Cl. ................................. 156/401; 156/416
[58] Field of Search ............... 156/123, 132, 394, 400, 156/401, 414–420

[56] References Cited

U.S. PATENT DOCUMENTS

| | | | |
|---|---|---|---|
| 3,438,832 | 4/1969 | Cantarutti | 156/401 |
| 3,560,301 | 2/1971 | Cantarutti | 156/401 |
| 3,692,605 | 9/1972 | Cantarutti | 156/401 X |
| 3,721,600 | 3/1973 | Cantarutti | 156/401 |
| 3,728,194 | 4/1973 | Enders | 156/401 X |
| 4,011,127 | 3/1977 | Eichholz et al. | 156/401 X |
| 4,081,310 | 3/1978 | Shichman et al. | 156/401 X |

OTHER PUBLICATIONS

Instruction Manual of NRM Corporation, "Tire Building Machine Model #88D, Bulletin TM-200", pp. 5–7.

*Primary Examiner*—John E. Kittle
*Attorney, Agent, or Firm*—Buell, Blenko, Ziesenheim & Beck

[57] ABSTRACT

The device comprises five concentric rings, the outer surfaces of which are contoured to form four circumferential split grooves in which the beads of the two bladders are clamped. The rings are assembled in proper angular position on dowels fixed to one end ring and extending through the three adjoining rings. Certain of the inner rings are clamped together as sub-assemblies by screws through their rims, and all five are clamped together by other screws extending through their rims.

7 Claims, 6 Drawing Figures

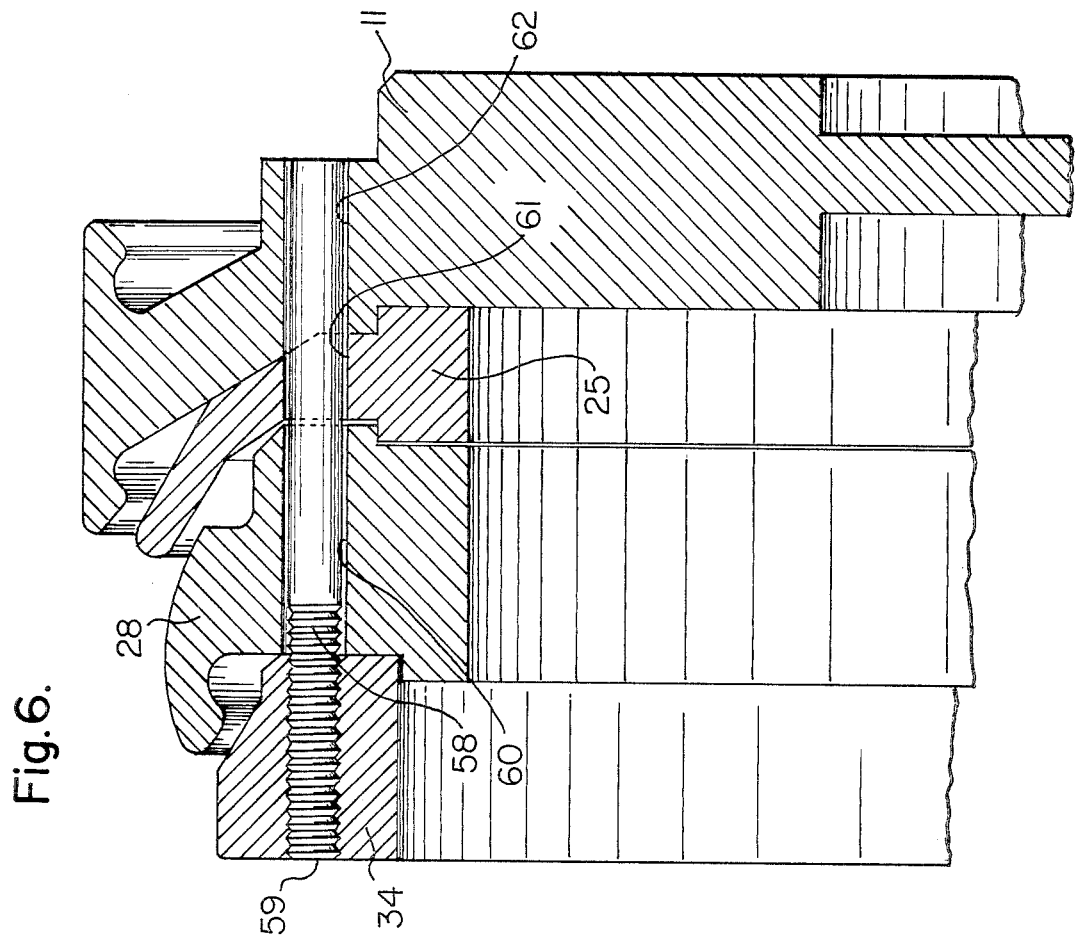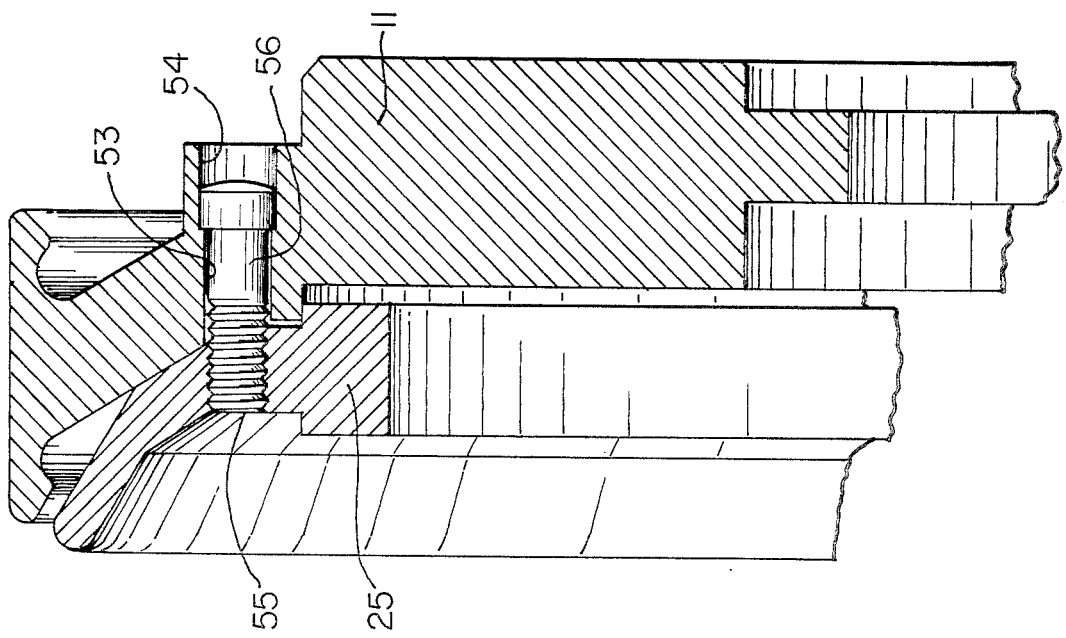

BLADDER HOLDER ASSEMBLY FOR TIRE MAKING MACHINE

This invention relates to tire building machines using inflatable bladders to wrap overhanging plies around a tire bead. It is more particularly concerned with apparatus for holding such bladders in place.

Pneumatic tire carcasses are conventionally built up from successive plies of rubber and other materials on radially collapsible mandrels. Tire beads are applied to each end of the carcass on the mandrel and the ply edges which overhang the mandrel are wrapped and turned around the beads by automatic machinery. A form of tire building machine which is commercially used wraps the ply edges around a bead by pneumatically inflated annular air bags, or bladders, as they are generally called. Such a machine is disclosed in Cantarutti U.S. Pat. No. 3,438,842 of Apr. 15, 1969. Two such bladders are employed at each end of the mandrel, which in their deflated position extend axially away from the carcass one on top of the other.

The bladders are annular with channel-like cross section. Each edge of the channels is formed around a stiff circular bead which is clamped between contoured rings. Air is admitted to each bladder through openings in a ring. The rings in turn must be held together, one against the other, so as to form with the bladders an assembly. Tires for different rim diameters require appropriate sizes of bladders and rings, and the various assemblies thereof must be readily interchanged on the tire building machine. The assemblies must also be readily disassembled and reassembled to replace bladders.

It is the principal object of my invention to provide a bladder holder assembly which is readily handled as a unit and which is readily assembled and disassembled. It is another object to provide such an assembly so constructed that the individual rings can be assembled only with their proper faces abutting each other. It is another object to provide such an assembly so constructed that the individual rings can be assembled only in the proper angular relation to each other. It is still another object to provide such an assembly which allows the bladders to adjust themselves angularly before their beads are clamped between their clamping rings. Other objects of my invention will appear in the course of the description thereof which follows.

My bladder holder assembly comprises five principal circular or ring-shaped elements which fit together in sequence. Beginning at the end nearest the drum of the tire building machine, the first element is the outer bladder clamp ring. The next is the outer bladder bead groove ring, which at its center is fastened to the tire building machine and supports all the other elements of my assembly. Its rim is contoured on each side to overhang a bladder bead ring. The outer bladder clamp ring previously mentioned clamps a bead of the outer bladder in the corresponding groove of the outer bladder bead groove ring.

The next element is the bladder spacer ring, the rim of which underlies the corresponding groove in the outer bladder bead groove ring and clamps the other bead of the outer bladder thereagainst. The next element is the inner bladder bead groove ring, the rim of which adjoining the bladder spacing ring is formed with an outwardly opening groove underlying the rim of that ring so as to clamp a bead of the inner bladder thereagainst. The inner bladder bead groove ring rim is formed on its other side to over lie the other bead of the inner bladder and that bead is clamped in place by the last element of my assembly, which is the inner bladder clamp ring.

All rings above mentioned are properly positioned with respect to each other by dowels, and are clamped together by a plurality of screws spaced circumferentially, each screw going through all elements and being inserted from the outer bladder clamp ring side.

An embodiment of my invention presently preferred by me is illustrated in the attached figures to which reference is now made.

FIG. 5 is a detail of my assembly taken on the plane V—V on FIG. 1.

FIG. 6 is a detail of my assembly taken on the plane VI—VI of FIG. 1.

Figure 1:
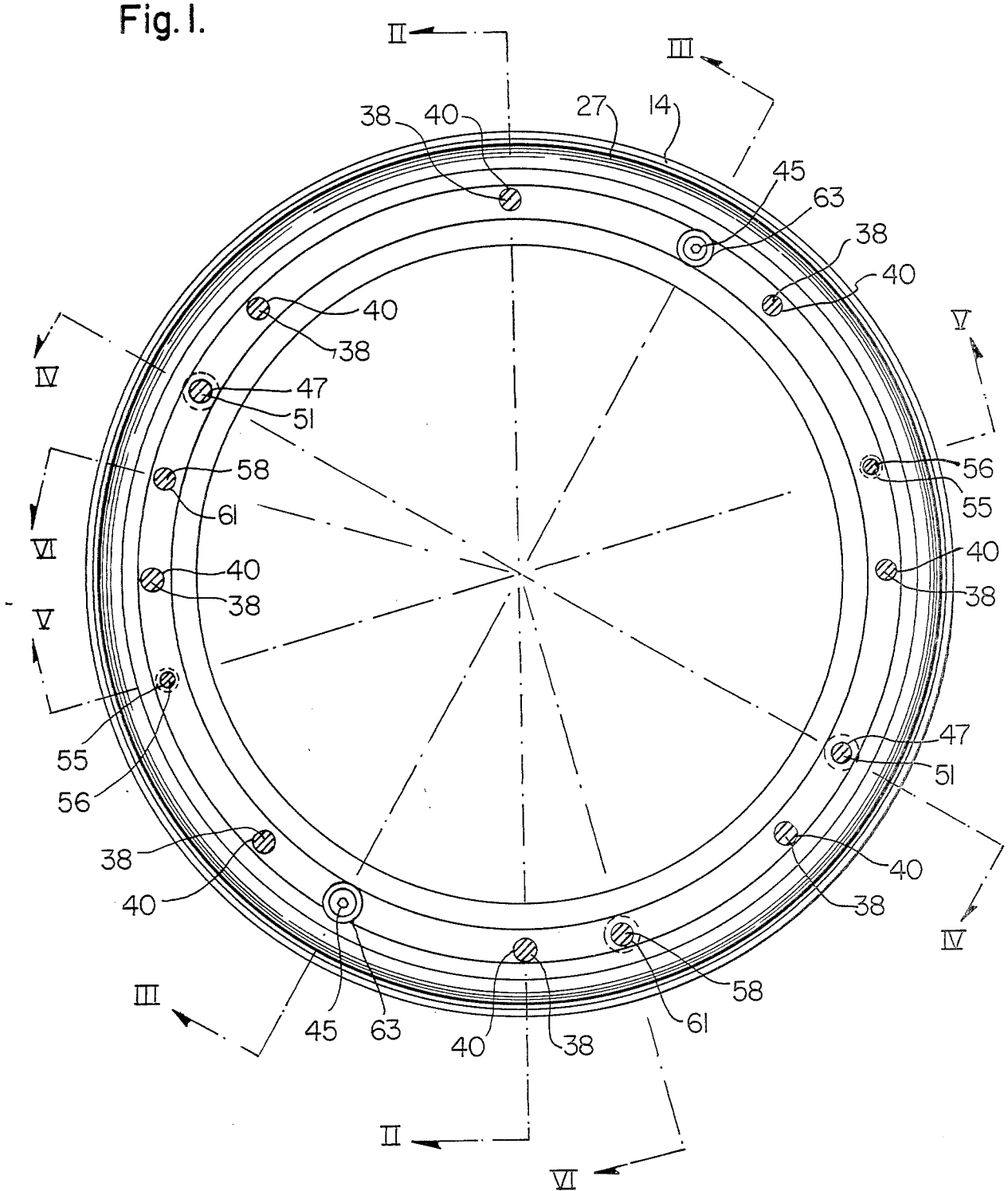
FIG. 1 is a cross section normal to the central axis of my bladder holding assembly, taken on the plane I—I of FIG. 2.
Figure 2:
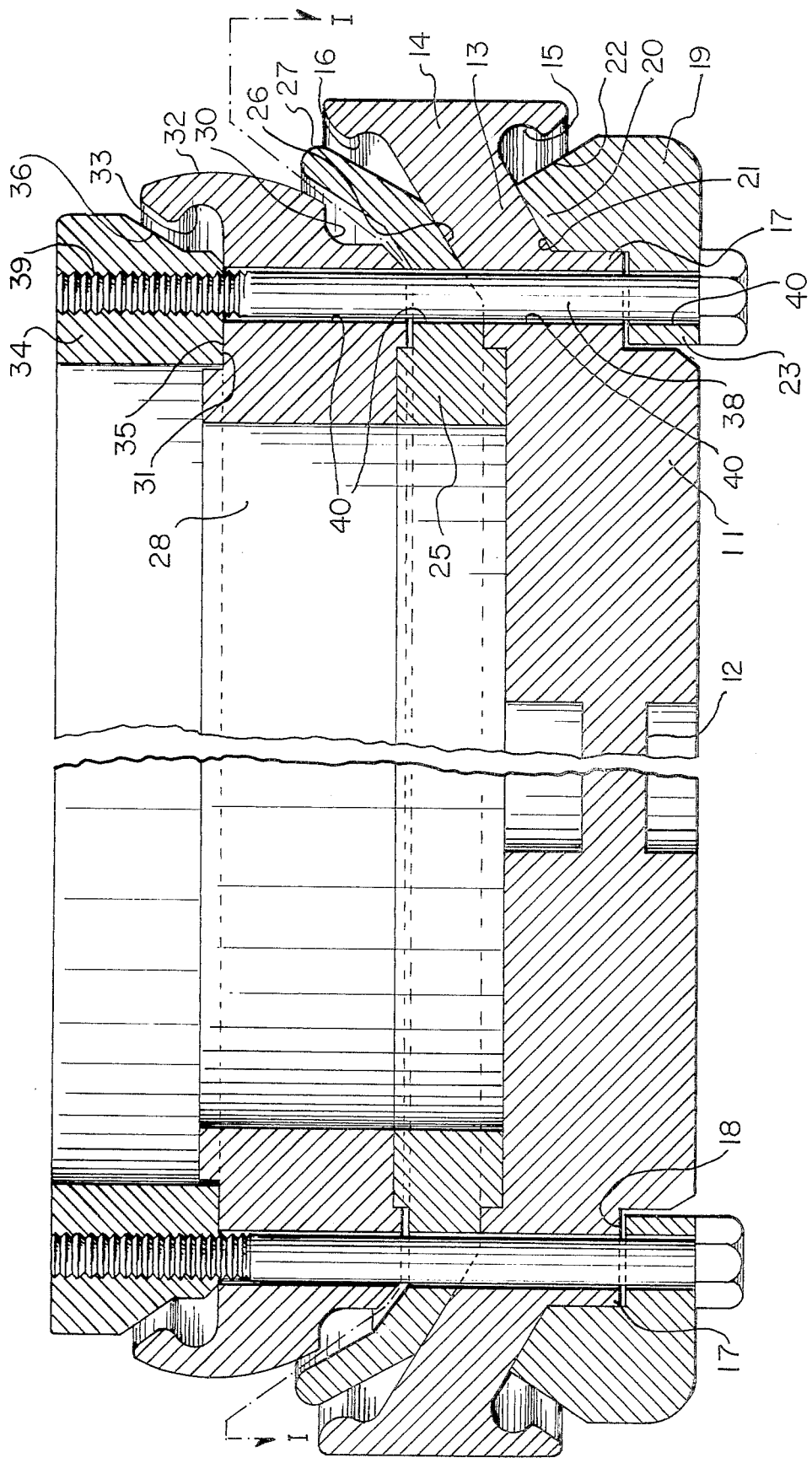
FIG. 2 is a cross section through my bladder holder assembly taken on the plane II—II of FIG. 1.

My assembly is supported by outer bladder bead groove ring 11 which at its center 12 is fastened to a tire building machine, for example one as is shown in Cantarutti U.S. Pat. No. 3,438,832 previously mentioned. The outer edge of ring 11 is formed with a narrow annular portion 13 sloping away from the drum of the tire building machine and having a rim 14 which overhangs portion 13 on each side. On the side nearer the drum, rim 14 is contoured along its lower edge into a groove 15 of semicircular cross section, and along its other side its lower edge is contoured into a like annular groove 16. Ring 11 adjoining portion 13 has a square shoulder 17 and adjoining square recess 18 machined therebelow on its face nearer the drum. Outer bladder clamp ring 19 has a rim 20 overhanging the shoulder 17 of ring 11, a face 21 abutting sloping portion 13 of ring 11 and an annular beveled face 22 opposite groove 15 in rim 14. A bead of the outer bladder is clamped in groove 15 by face 22 of ring 19. That ring has a depending skirt 23 which fits into recess 18 of outer bladder bead groove ring 11.

Adjoining ring 11 is bladder spacer ring 25, a portion of the outer rim of which is sloped at 26 adjoining sloped portion 13 of ring 11 to the same angle. The outermost portion 27 of the rim is spaced below groove 16 so as to clamp the other bead ring of the outer bladder therein. The underside of portion 27 of the rim is approximately parallel to its upper side and fits against inner bladder bead groove ring 28, to be described. The rim of that ring 28 adjoining bladder spacer ring 25 is formed into an outwardly opening annular groove 30 opposite the junction of portions 26 and 27 of ring 25. A bead ring of the inner bladder is clamped between groove 30 and portions 26 and 27 above mentioned. The other face of the rim of inner bladder bead groove ring 28 terminates in an overhanging rim portion 32 formed on its underside into a groove 33. Inner bladder clamp ring 34 adjoins inner bladder groove ring 28 and has a planar annular face 35 abutting recessed face 31 of ring 28. Ring 34 below groove 33 in ring 28 is beveled outwardly at 36 so as to clamp the other bead ring of the inner bladder therebetween. Aligned holes 40 are drilled through the skirt 23 of outer bladder clamp ring 19 and through adjoining rim portions of ring 11, 25, 28 and 34. The holes in ring 34 are provided with threads 39 and screws 38 inserted from outer bladder clamp ring 19 passing through the aligned holes 40 above mentioned screw into threads 39, and hold all rings together into a single assembly.

Air is introduced into the inner bladder through passages in inner bladder bead groove ring 28 opening in the ring thereof between grooves 30 and 33. Air is introduced into the outer bladder through passages in outer bladder bead groove ring 11 opening in the rim thereof between grooves 15 and 16. The passages above mentioned are not shown or otherwise described herein because they are conventional and are disclosed in Cantarutti U.S. Pat. No. 3,438,832 previously mentioned.

Figure 3:
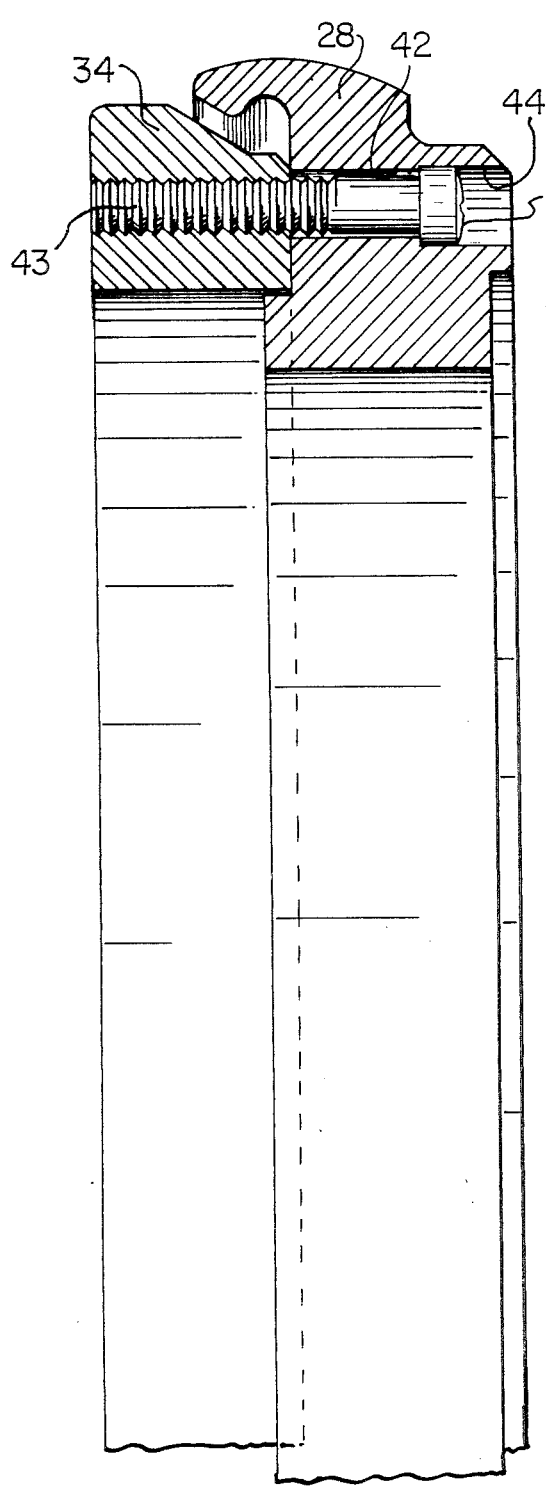
FIG. 3 is a detail of my assembly taken on the plane III—III of FIG. 1.

In order to facilitate the assembly of our bladder holder with the bladder, certain of the rings above mentioned are detachably fastened to certain of the remaining rings as will be described. Inner bladder bead groove ring 28 is formed with a pair of holes 42 passing through its rim portion, which holes are angularly displaced from holes 40 previously mentioned. As is shown in FIG. 3, those holes 42 are aligned with tapped holes 43 in inner bladder clamp ring 34. Holes 42 are counterbored at 44 from the face of inner bladder bead groove ring 28 which abuts bladder spacer ring 25 to receive the heads of screws 45 which screw into the threads of tapped holes 43 in inner bladder clamp ring 34.

Figure 4:
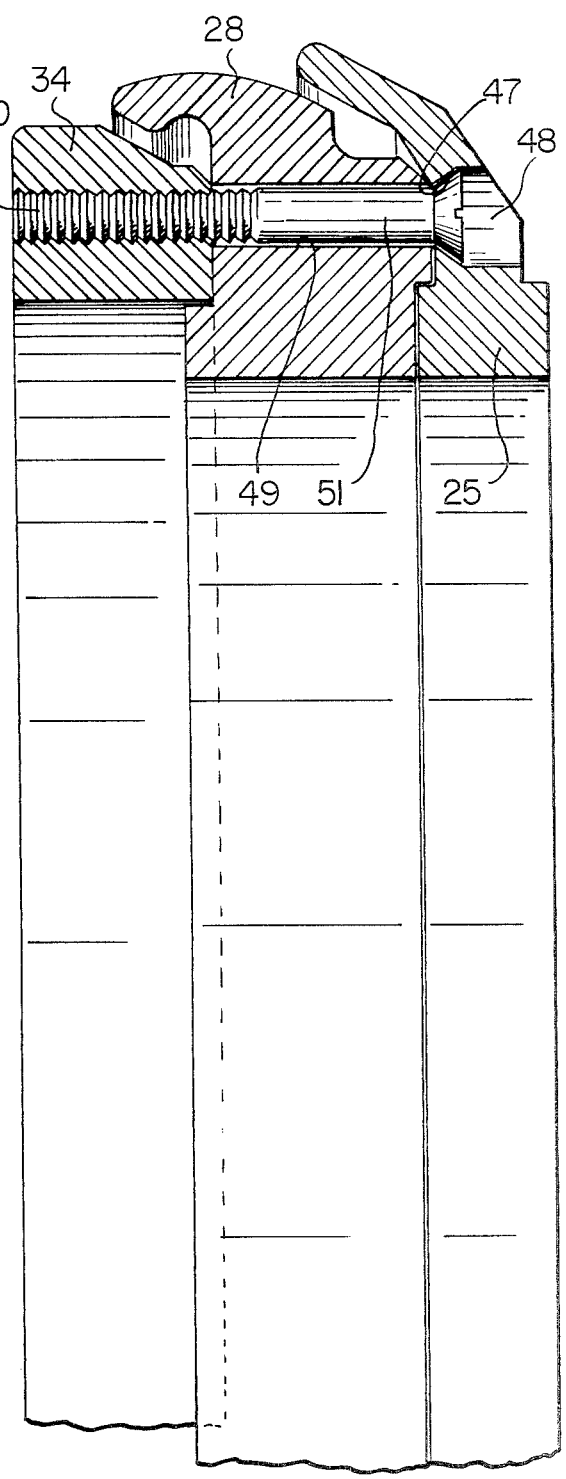
FIG. 4 is a detail of my assembly taken on the plane IV—IV of FIG. 1.

Bladder spacer ring 25 is formed with a pair of holes 47 in its rim portion as is shown in FIG. 4, which holes are angularly displaced from holes 40 and 42 previously mentioned. Those holes 47 are countersunk at 48 from the face of ring 25 which abuts outer bladder bead groove ring 11. Inner bladder bead groove ring 28 and inner bladder clamp ring 34 are formed with holes 49 and 50, respectively, aligned with holes 47, holes 50 being tapped. Screws 51 pass through holes 47 and 49 and screw into holes 50 holding the three rings above mentioned together.

Likewise, as appears in FIG. 5, outer bladder bead groove ring 11 is formed with a pair of holes 53 in its rim which are angularly displaced from holes 40, 42 and 47 previously mentioned. Those holes are counterbored at 54 from the face of ring 11 abutting outer bladder clamp ring 19. Tapped holes 55 are formed in bladder spacer ring 25, aligned with holes 53. Screws 56 pass through holes 53 and screw into holes 55 in bladder spacer ring 25, holding those two rings together.

In addition to the screw arrangements above mentioned, my rings are provided with dowels and dowel holes so that the angular relations between successive rings are fixed. As is shown in FIG. 6, inner bladder clamp ring 34 has dowels 58 screwed into tapped holes 59 in its face abutting inner bladder bead groove ring 28. Corresponding aligned holes 60, 61 and 62 are formed in rings 28, 25 and 11, respectively, through which dowels 58 pass when the rings above mentioned are in proper angular alignment. Two dowels 58 angularly spaced from each other by less than 180° are satisfactory for this purpose.

The bladders, as are shown in Cantarutti U.S. Pat. No. 3,438,832 previously mentioned are more or less doughnut-shaped when inflated, having stiff bead rings around their inner edges which are gripped by my bladder holding apparatus hereinabove described. The bladders are assembled with my apparatus starting from inner bladder clamp ring 34. The inner bead of the inner bladder is positioned against bevel 36 of inner bladder clamp ring 34, and inner bladder bead groove ring 28 is threaded over dowels 58 which are so positioned that face 31 of ring 28 will abut face 35 of ring 34. Rings 28 and 34 are brought together, holding the inner bead of the inner bladder between them in groove 33 of ring 28. Screws 45 are screwed into tapped holes 43 in ring 34 through holes 42 in ring 28, securing the bead of the bladder. The outer bead of the inner bladder is laid in groove 30 of ring 28 and spacer ring 25 is threaded over dowels 58, holes 61 in ring 25 being so positioned that rim portion 26 of spacer ring 25 bears against the bladder bead and hold it in groove 30. Screws 51 are then screwed into tapped holes 50 of inner bladder clamp ring 34 through holes 47 and 49 of rings 25 and 28, respectively, securing the outer bead of the inner bladder.

The inner bead of the outer bladder is then laid against the exposed face of rim portion 27 of ring 25 and outer bladder bead groove ring 11 is threaded on dowels 58, holes 62 in ring 11 being positioned so that annular groove 16 of ring 11 fits against the inner bead of the outer bladder and that bead is held there by ring 25. Screws 56 are then screwed into tapped holes 55 in ring 25 through holes 53 in ring 11, securing the bead above mentioned. Finally, the outer bead of the inner bladder is laid in groove 15 of ring 11 and outer bladder clamp ring 19 is brought against ring 11 so that beveled face 22 of ring 19 holds the bead in groove 15. Screws 38 are passed through aligned holes 40 of rings 19, 11, 25 and 28 and are screwed into threads 39 of holes 40 in inner bladder clamp ring 34, completing the assembly.

The counterbore 44 of hole 42 in ring 28 and the counterbore 54 of hole 53 in ring 11 are sufficient to provide clearance between the heads of screws 45 and 56 and their adjoining ring faces, respectively, without fully tightening those screws. I assemble my bladders on my apparatus above described in the way above mentioned without fully tightening those screws, thus, permitting the bladder beads to adjust themselves in those grooves so as to relieve any strains on the bladders, and clamp them firmly after such adjustment by tightening screws 38 only. If necessary, holes may be formed in the rings overlying the heads of screws 45, 56 as at 63 in ring 25, and also screws 51, which because of the relative thinness of ring 25 have less clearance than the others, large enough to accommodate those screw heads and provide additional clearance therefore.

In the foregoing specification I have described a presently preferred embodiment of my invention; however, it will be understood that my invention can be otherwise embodied within the scope of the following claims.

I claim:

1. In an inner and outer bladder holder assembly for a tire making machine comprising an inner bladder bead ring and an outer bladder bead ring, a bladder spacing ring position between the inner and outer bladder bead rings, an inner bladder clamp ring positioned on the other side of the inner bladder bead ring, and an outer bladder clamp ring positioned on the other side of the outer bladder bead ring, the improvement comprising a plurality of detachable fasteners fastening all the said rings together into a unitary assembly, each fastener comprising a single fastener extending through all said rings and accessible for insertion and withdrawal from the outer bladder clamp ring, a second plurality of detachable fasteners fastening some, but not all of the rings together through holes therein into sub-assemblies, and dowel means positioning the outer bladder bead ring, the bladder spacing ring, the inner bladder bead ring and the inner bladder clamping ring only with respect to each other, those holes being counterbored so that the second plurality of detachable fasteners therein clear overlying rings, whereby the second plurality of detachable fasteners may be tightened to permit limited movement between adjoining rings prior to tightening of the fasteners extending through all rings.

2. The assembly of claim 1 in which the outer bladder bead ring is of greater diameter than the inner bladder bead ring and the outer bladder clamp ring has a skirt extending radially inwardly to overlap the outer end face of the outer bladder bead ring, said fastener extending through said skirt so as to clamp all rings tightly together.

3. The assembly of claim 2 in which the outer bladder bead ring has a recess in its outer end face which receives said skirt.

4. The assembly of claim 1 in which the second plurality of detachable fasteners comprise detachable fastener means inserted through the outer bladder bead groove ring for fastening together said outer bladder bead groove ring and the bladder spacing ring only, said bladder bead groove ring and its overlying outer bladder clamp ring being formed to allow clearance therebetween for said fastener means.

5. The assembly of claim 1 in which the second plurality of detachable fasteners comprise detachable fastener means inserted through the bladder spacing ring for fastening together said bladder spacing ring, inner bladder bead ring and inner bladder clamp ring only, said bladder spacing ring and its overlying outer bladder bead groove ring being formed to allow clearance therebetween for said fastener means.

6. The assembly of claim 1 in which the second plurality of detachable fasteners comprise detachable fastener means inserted through the inner bladder bead groove ring for fastening together said inner bladder bead groove and inner bladder clamp ring only, said inner bladder bead groove ring and its overlying bladder spacing ring being formed to allow clearance for said fastener means.

7. The assembly of claim 1 in which the dowel means are affixed to the inner bladder clamp ring.

* * * * *